Jan. 28, 1947.　　　　E. R. ATKINS　　　　2,414,997
SWIVEL JOINT ASSEMBLY
Filed Aug. 18, 1944
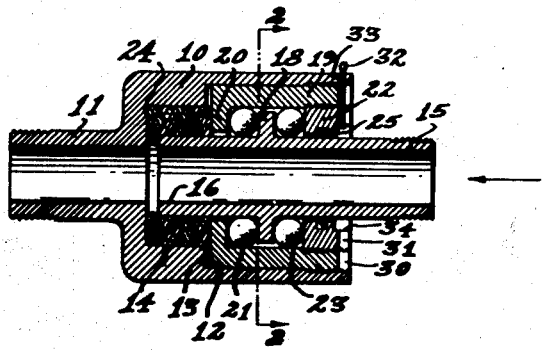
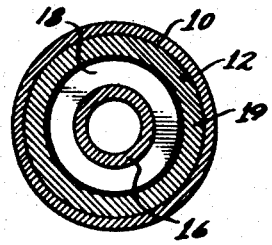 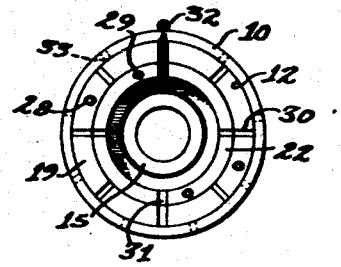
EARLE R. ATKINS
INVENTOR.
BY
ATTORNEY Patented Jan. 28, 1947

2,414,997

UNITED STATES PATENT OFFICE 2,414,997

SWIVEL JOINT ASSEMBLY

Earle R. Atkins, Whittier, Calif., assignor to Earle R. Atkins Company, Huntington Park, Calif., a corporation of California Application August 18, 1944, Serial No. 549,982

5 Claims. (Cl. 285—97.3)

This invention relates to an improved swivel joint assembly for piping to prevent leakage between two sections of pipe which are secured together in such a manner as to permit them to have relative axial turning movement.

This invention is particularly designed for use as a part of the piping system in which liquids are conducted under pressure and it consists essentially of a cup-shaped housing which, together with complementary parts including a pipe section, form ball races for two series of balls, one series on each side of a flange formed on the pipe section, means being provided for packing between the pipe section and the housing.

It is an object of this invention to provide a swivel joint assembly in which the pressure on the packing is adjustable and in which the ball bearings may be simply adjusted as a unit, such adjusting of the packing permitting the ready adaptability of the assembly for handling steam, chemicals, continuous, or merely occasional swivel action.

Other objects and advantages will appear hereinafter from the following description and drawing.

Referring to the drawing, which is for illustrative purposes only:

Fig. 1 is a longitudinal sectional view of a swivel joint assembly embodying a form of my invention;

Fig. 2 is a cross sectional view on line 2—2, Fig. 1; and

Fig. 3 is an end view looking in the direction of the arrow in Fig. 1.

Referring more particularly to the drawing, 10 indicates a cup-shaped housing formed with a nipple indicated at 11 externally threaded to receive any suitable pipe connection. 12 indicates a bore in the housing having a shoulder 13, thereby reducing the bore at the inner end to form a packing chamber indicated at 14.

The housing just described forms the outer member of the swivel assembly. The inner member comprises a pipe section indicated at 15 which is externally threaded at its outer end to receive a pipe connection and the inner end 16 of which extends into the packing chamber 14. Formed on the pipe section 15 intermediate its length is an external circular flange indicated at 18, such flange 18 and the adjacent exterior portions of the pipe section 15 forming the inner member of a ball race on each side of flange 18. Threaded into the open end of the housing 10 is a bearing sleeve indicated at 19, the inner end of which is provided with an inwardly extending circular flange indicated at 20, which, in the normal assembly of the assembly, is spaced apart from the shoulder 13 of the housing 10. Arranged between the flange 20 on the sleeve 19 and the flange 18 on the pipe section 15 is a series of bearing balls indicated at 21 and arranged between the flange 18 on the pipe section and a follower ring 22. Threaded into the outer end of the sleeve 19 is a series of balls indicated at 23.

With the construction just described the threaded engagement of the follower ring with the sleeve 19 permits an adjustment of the series of balls 21 and 23 simply by adjustment of the follower ring 22. Arranged in the chamber 14 between the inner end of the bore 12 and the flange 20 on the sleeve 19 is a compressible packing ring or rings which may be of any desired form, such packing engaging about the inner end of the pipe section 15. It will be readily understood that the sleeve 19 may be adjusted in the housing to increase or decrease pressure on the packing 24. 25 designates a yieldable sealing ring seated in the ring 22 and engaging the pipe section 15 to prevent dust and grit from entering the ball races.

The adjustment of the sleeve 19 and follower ring 22 is done by means of a spanner wrench inserted in holes 28 and 29 in the sleeve and ring respectively. For the purpose of locking the sleeve 19 and ring 22 in adjusted position these members are provided in their outer face with radial grooves 30 and 31 respectively adapted to receive a cotter pin 32 or other locking member inserted through openings 33 in the end of the housing 10, the outer face of the ring 22 being recessed as indicated at 34 to allow bending of the ends of the pin. There are a greater number of openings 33 in the housing than grooves 30 in the sleeve 19 and a greater number of grooves 30 in the sleeve 19 than grooves 31 in the ring 22 so that a very fine adjustment may be made.

From the above description it will readily appear that the assembly may be simply manufactured by the ordinary machine operations and the parts may be readily adjusted not only insofar as the packing is concerned, but also the friction on the ball bearings, this being done simply without disassembling the parts. In the event that it is desirable to change the packing, this may be simply done by merely unthreading the sleeve 19 from the housing and removing such sleeve, the bearings, and inner pipe section as a unit.

While I have shown and described a preferred form of my invention, it is to be understood that it is intended to cover such modifications and changes as come within the scope of the appended claims.

I claim as my invention:

1. A swivel joint assembly comprising: a cup-shaped housing having a bore formed with a shoulder therein; a nipple formed on one end of said housing; a bearing sleeve threaded into the other end of said housing; an inwardly extending flange formed on the inner end of said sleeve; a pipe section extending through said sleeve; an outwardly extending flange formed on said pipe section; a series of bearing balls on each side of the flange on the pipe section engaging the flanges on the sleeve and the pipe section; a follower ring threaded into the outer end of said bearing sleeve engaging the adjacent series of bearing balls; and a packing ring in said housing about the pipe section engageable by the flange on said bearing sleeve.

2. A swivel joint assembly comprising: an annular housing having a fluid passage at one end and an enlarged bore at the other end; a bearing sleeve in said bore threaded therein; an inwardly extending flange on said bearing sleeve at its inner end; a pipe section extending into the bore in said housing through said bearing sleeve; an outwardly extending flange on said pipe section intermediate its length; bearing balls on both sides of said flange on the pipe section; an adjustable follower ring in the outer end of said bearing sleeve engaging the adjacent bearing balls on one side of the flange on the pipe section; and a compressible packing ring in the bore in said housing engageable by the inner end of said bearing sleeve.

3. In a swivel joint assembly the combination of: a pipe section having an outwardly extending annular flange intermediate its length; a bearing sleeve receiving said pipe section; an inwardly extending annular sleeve on one end of said sleeve; bearing balls on each side of the flange on said pipe section; the balls on one side of the flange on the pipe section being engaged by the flange on said sleeve; an adjustable follower ring in the other end of the bearing sleeve engaging the bearing balls on the other side of the flange on the pipe section; and a housing adjustably receiving said bearing sleeve.

4. In a swivel joint assembly the combination of: a pipe section having an outwardly extending annular flange intermediate its length; a bearing sleeve receiving said pipe section; an inwardly extending annular sleeve on one end of said sleeve; bearing balls on each side of the flange on said pipe section; the balls on one side of the flange on the pipe section being engaged by the flange on said sleeve; an adjustable follower ring in the other end of the bearing sleeve engaging the bearing balls on the other side of the flange on the pipe section; a housing adjustably receiving said bearing sleeve; said bearing sleeve and said follower ring having radial grooves formed in their outer face and locking means on said housing engaging in the said grooves.

5. A swivel joint comprising a housing assembly including an outer tubular housing member having an end wall adapted to be connected to a pipe, said end wall having an opening therethrough, and a bearing sleeve secured concentrically in said housing member and having an annular inwardly disposed flange spaced from said end wall whereby to provide a packing chamber therebetween, a pipe section disposed concentrically in the sleeve and extending at its inner end into the packing chamber, a compressible packing in the packing chamber around the inner end portion of the pipe section, said pipe section having a peripheral flange within the sleeve and spaced from said annular flange, ball bearing means between said annular flange and said peripheral flange, and means retaining the pipe section in the sleeve for rotatability and for axial adjustment relative thereto whereby to compensate for wear, the last-named means comprising a follower member disposed around the outer end portion of the pipe section and axially adjustably secured to said housing assembly.

EARLE R. ATKINS.